United States Patent [19]

Urushibata et al.

[11] Patent Number: 4,653,110

[45] Date of Patent: Mar. 24, 1987

[54] IMAGE PROCESSOR SYSTEM

[75] Inventors: Yukio Urushibata; Yukio Shiraogawa, both of Tokyo, Japan

[73] Assignee: Kabushiki Kaisha Toshiba, Kawasaki, Japan

[21] Appl. No.: 792,848

[22] Filed: Oct. 30, 1985

[30] Foreign Application Priority Data

Oct. 31, 1984 [JP] Japan .................................. 59-229224

[51] Int. Cl.$^4$ .............................................. G06K 9/00
[52] U.S. Cl. ......................................... 382/41; 382/27
[58] Field of Search .................... 382/30, 41, 69, 27; 364/133, 134

[56] References Cited

U.S. PATENT DOCUMENTS

| 4,158,834 | 6/1979 | Nakanishi et al. | 382/69 |
| 4,429,414 | 1/1984 | Asakawa | 382/30 |
| 4,434,502 | 2/1984 | Arakawa et al. | 382/41 |
| 4,550,437 | 10/1985 | Kobayashi et al. | 382/27 |

Primary Examiner—Leo H. Boudreau
Attorney, Agent, or Firm—Finnegan, Henderson, Farabow, Garrett & Dunner

[57] ABSTRACT

In the image processor system of the invention, an image processor and a plurality of image memories are connected through a plurality of image buses. The image processor and image memories are also connected through a control bus, as is a CPU. The image processor has a start signal output gate circuit. When the gate circuit is initiated by the CPU, it simultaneously outputs start signals designating image data output to the image buses designated by the CPU. Each image memory has a start signal input gate circuit and an output gate circuit. The start input gate circuit receives the start signal from the image bus designated by the CPU through the control bus. The output gate circuit starts image data output to the designated image bus in response to the start signal received at the start signal input gate circuit and in synchronism with the bus cycle of the image bus.

3 Claims, 10 Drawing Figures

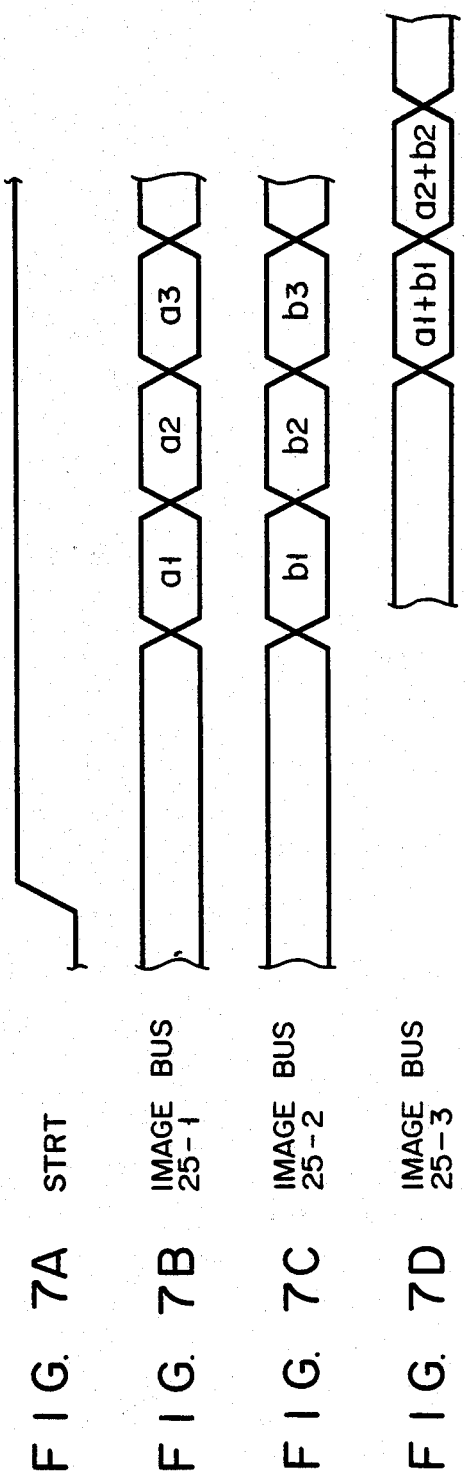

IMAGE PROCESSOR SYSTEM

BACKGROUND OF THE INVENTION

The present invention relates to an image processor system having a function for performing image processing using the content of a plurality of image memories.

The typical image processor system, as shown in FIG. 1, has an image processor 11, a plurality of image memories 12-1 through 12-3, and a CPU 13 for controlling the image processor 11 and image memories 12-1 through 12-3. The CPU 13 and the image processor 11 are connected through an internal bus 14, and the respective image memories 12-1 through 12-3 are connected to each other through a memory bus 15. A memory control unit 16 (to be referred to as an MCU hereinafter) is connected to the buses 14 and 15.

The image processor system as described above can combine a plurality of images. The processor 11 receives image data from, for example, the memories 12-1 and 12-2 and ORes the received data. The image combining procedures are as follows:

(i) The CPU 13 reads out data from the image memory 12-1 through the MCU 16 and transfers the readout data to the image processor 11.

(ii) The CPU 13 reads out data from the image memory 12-2 through the MCU 16 and transfers the readout data to the processor 11.

(iii) The image processor 11 ORes the image data read out from the memories 12-1 and 12-2.

(iv) The ORed result is written in the memory 12-3 under the control of the CPU 13.

(v) The operations of items (i) through (iv) above are repeated for a required screen region (window), and synthetic image data is obtained in the memory 12-3.

However, when data is read out from a plurality of image memories and image processing is performed in the conventional image processor system described above, data must be read out serially. In addition, the CPU 13 is involved in each data read operation from the memories. For this reason, the conventional image processor system requires a long processing time and the effeciency of CPU processing is degraded.

SUMMARY OF THE INVENTION

It is an object of the present invention to provide an image processor system which allows parallel and synchronous data read operation from a plurality of image memories, independent of a CPU.

According to the present invention, high-speed image processing can be performed and the processing efficiency of the CPU improved. Easy synchronization of different processes is possible when different processes are being performed parallel to each other through a plurality of image buses, since a start signal is transferred through a designated image bus.

In order to achieve the above object of the present invention, there is provided an image processor system comprising:

a control bus and a plurality of image buses for connecting an image processor and a plurality of image memories;

a central processing unit (CPU) for controlling the image processor and image memories through the control bus;

a start signal output gate circuit, arranged in the image processor, for simultaneously outputting start signals designating the start of image data output to those of the plurality of image buses which are designated by the CPU;

a start signal input gate circuit, arranged in each image memory, for receiving the start signal through the image bus designated by the CPU;

means, arranged in each image memory, for starting image data output to the designated image bus synchronously with the bus cycle of the image bus and in response to the start signal received through the corresponding start signal input gate circuit; and means, arranged in the image processor, for simultaneously fetching the data from the designated image buses.

Brief Description of the Drawings

Other objects and features of the present invention will be apparent from the following description which is given in connection with the accompanying drawings, in which:

FIGS. 7A through 7D are timing charts explaining the mode of operation of the embodiment shown in FIG. 2, in which FIG. 7A shows a start signal STRT, and FIGS. 7B through 7D show state signals of the image buses 25-1, 25-2 and 25-3, respectively.

Detailed Description of the Preferred Embodiment

Figure 1:
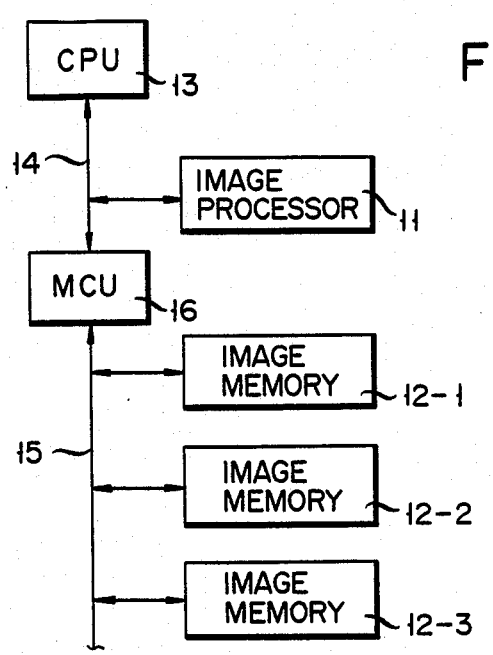
FIG. 1 is a block diagram of a conventional image processor system.
Figure 2:
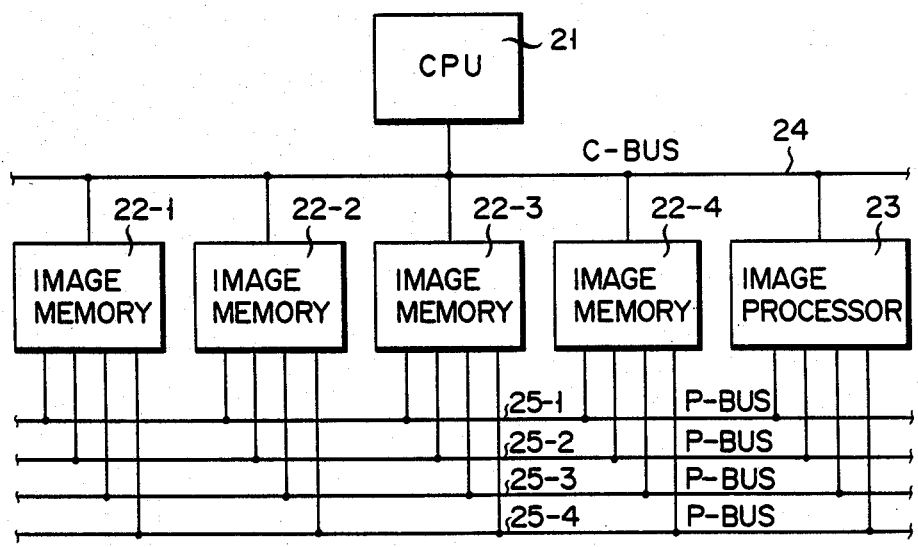
FIG. 2 is a block diagram of an image processor system according to an embodiment of the present invention.

Referring to FIG. 2, an image processor system according to an embodiment of the present invention has a CPU 21, image memories 22-1 through 22-4 and an image processor 23. The CPU 21, the image memories 22-1 through 22-4 and the image processor 23 are connected to a control bus (C-BUS) 24 which transfers mainly control data. The image memories 22-1 through 22-4 and image processor 23 are also connected to image buses (P-BUS) 25-1 through 25-4, respectively, and transfer mainly image data. The image buses 25-i (i=1 through 4) include transfer lines (not shown) of the start signals STRT for designating the start of the output of image data to the image memories 22-1 through 22-4.

Figure 3:
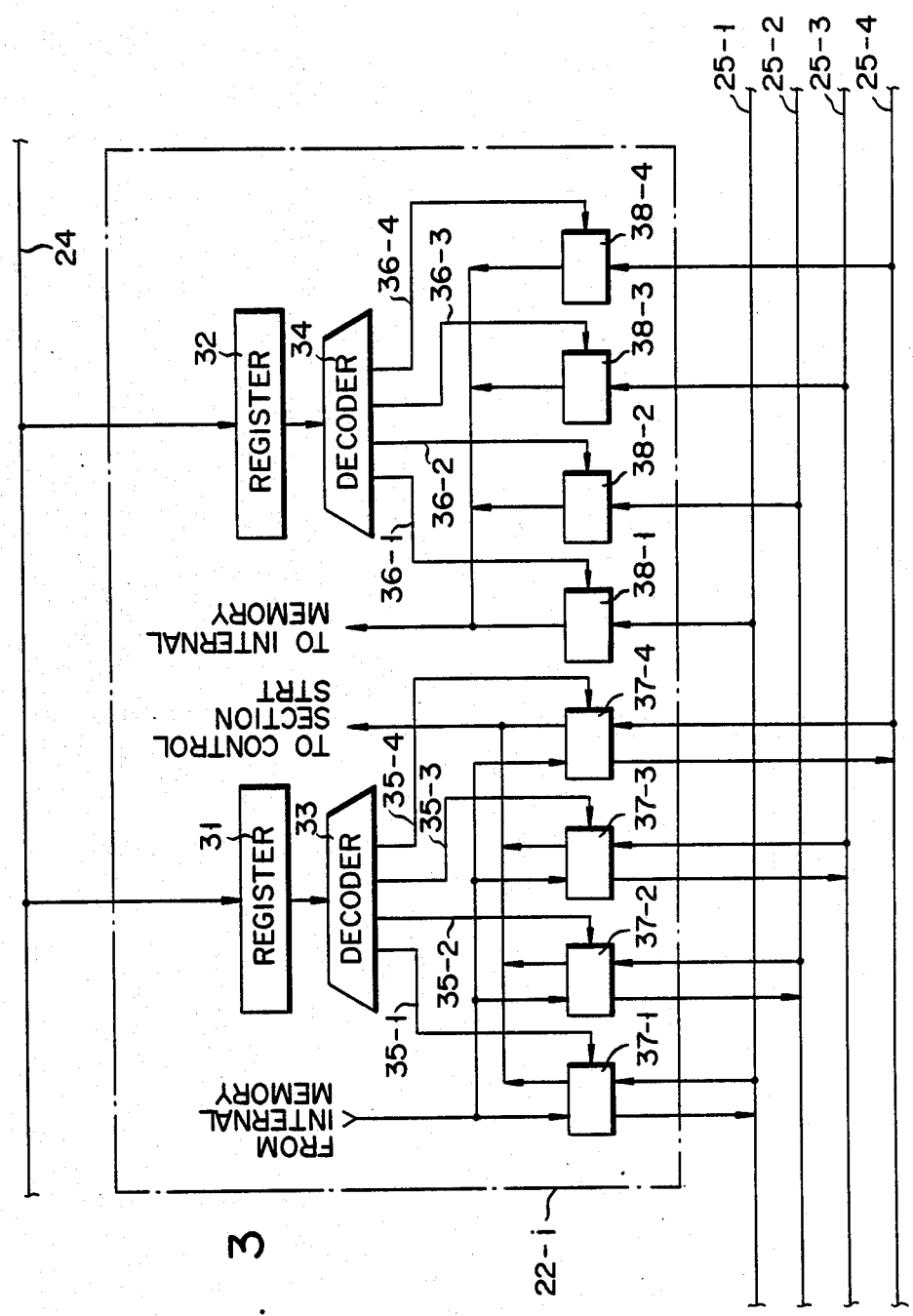
FIG. 3 is a detailed block diagram of one of the image memories shown in FIG. 2.

FIG. 3 is a detailed block diagram of the image memory 22-i (i='through 4) shown in FIG. 2. Registers 31 and 32 hold image bus designation data for designating the image bus 25-i (i=1 through 4). The image bus designation data is supplied to the registers 31 and 32 from the CPU 21 through the control bus 24. Decoders 33 and 34 decode image bus designation data held in the registers 31 and 32, and supply active signals to signal lines 35-1 through 35-4 and signal lines 36-1 through 36-4, respectively.

Gate circuits 37-1 through 37-4 supply readout data from internal memories (not shown) in the image memories 22-i through the image buses 25-1 through 25-4, and also supply the start signals STRT from the image buses 25-2 through 25-4 to control sections (not shown) in the image memories 22-i. Gate circuits 38-1 through 38-4 supply data from the image buses 25-1 through 25-4 to the internal memories (not shown) of the image memories 22-i. Each gate circuit 37-j (j=1 through 4) is enabled in accordance with the logic state of the corresponding signal line 35-j, and each gate circuit 38-j (i=1 through 4) is enabled in accordance with the logic state of the corresponding signal line 36-j.

Figure 4:
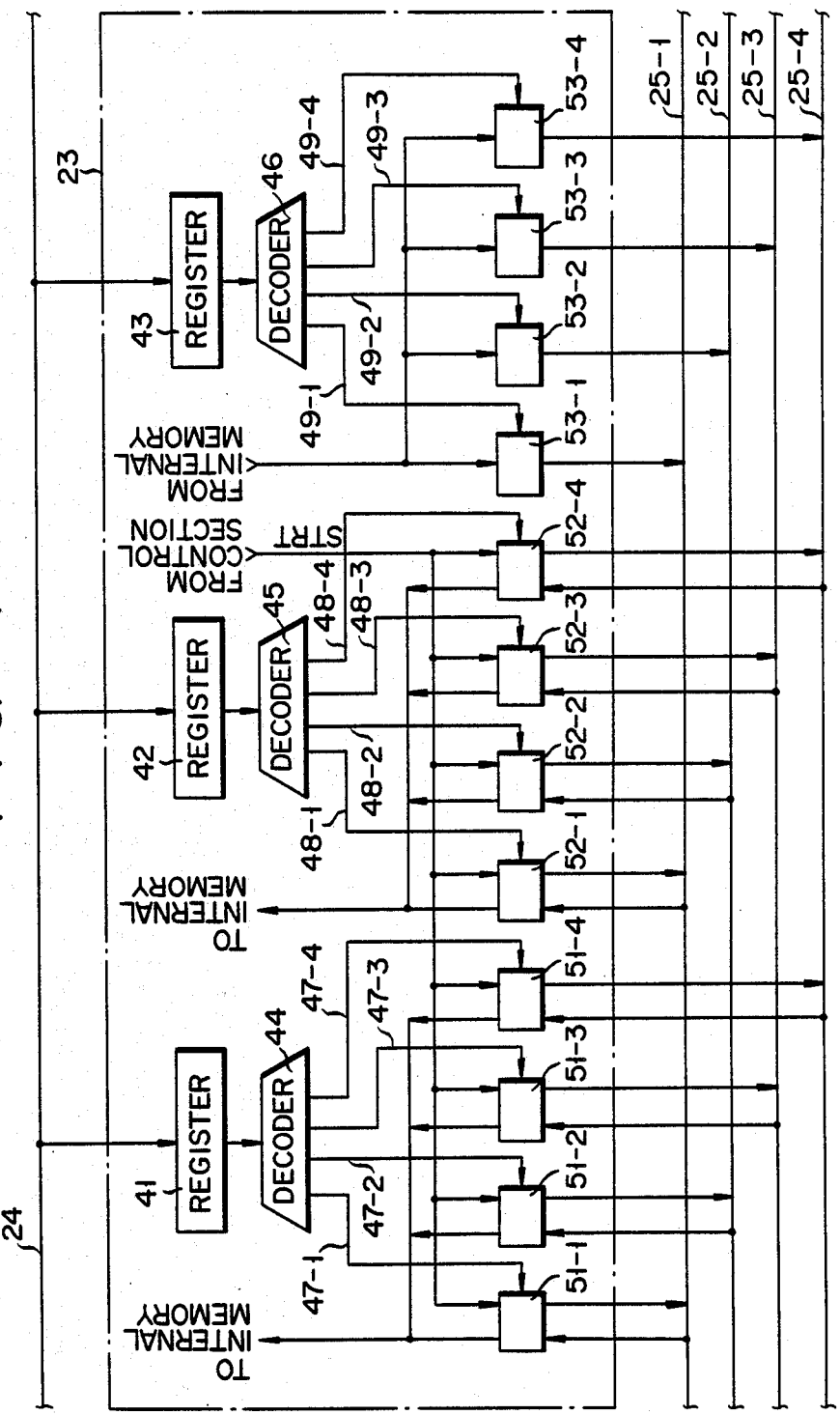
FIG. 4 is a detailed block diagram of the image processor shown in FIG. 2.

FIG. 4 is a detailed block diagram of the image processor 23 shown in FIG. 2. Registers 41, 42 and 43 are connected to the control bus 24, and hold image bus designation data for designating image buses. Decoders 44, 45 and 46 are connected to the registers 41, 42 and 43 and decode image bus designation data held therein. The decoders 44, 45 and 46 produce active signals to signal lines 47-1 through 47-4, 48-1 through 48-4, and 49-1 through 49-4, respectively. Gate circuits 51-1 through 51-4 and 52-1 through 52-4 supply control data from the image buses 25-1 through 25-4 to the internal memory (not shown) of the image processor, and supply the start signals STRT for starting the image memories 22-i from the control section (not shown) in the image processor 23 to the image buses 25-1 through 25-4. Each gate circuit 51-j (j=1 through 4) is enabled in accordance with the logic state of the corresponding signal line 47-j. Each gate circuit 52-j (j=1 through 4) is enabled in accordance with the logic state of the corresponding signal line 48-j, and each gate circuit 53-j (j=1 through 4) is enabled in accordance with the logic state of the corresponding signal line 49-j.

Figure 5:
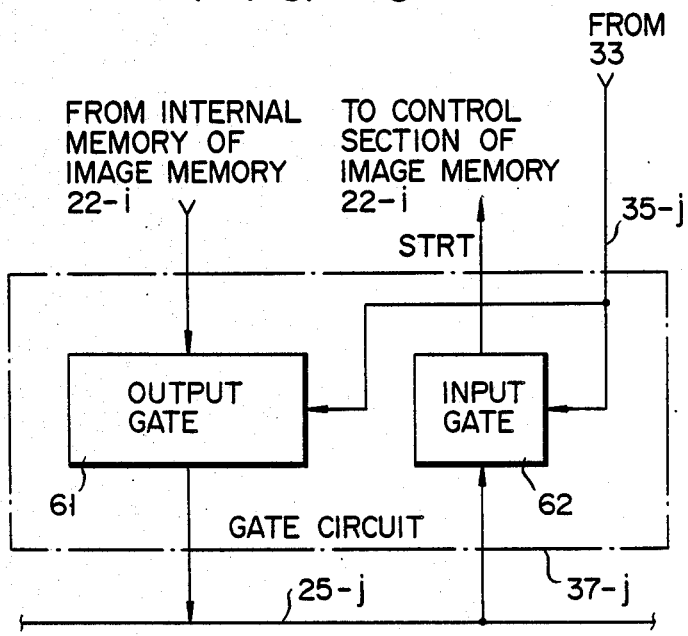
FIG. 5 is a block diagram showing the configuration of the gate circuit shown in FIG. 3.

FIG. 5 shows the configuration of each gate circuit 37-j (j=1 through 4) in FIG. 3. An output gate 61 supplies data read out from the internal memory (not shown) of the image memory 22-i to the image bus 25-j. An input gate 62 supplies the start signal STRT from the image bus 25-j to the control section (not shown) in the image memory 22-i. The output and input gates 61 and 62 are enabled in accordance with the state of the signal line 35-j.

Figure 6:
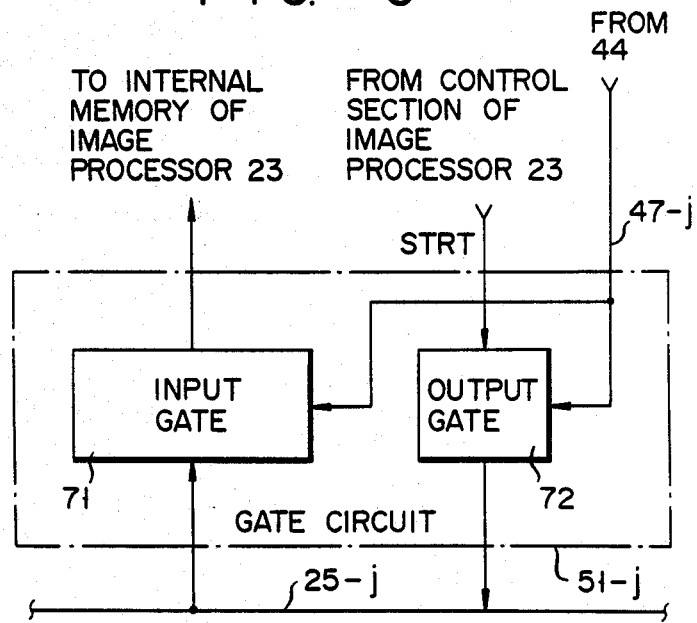
FIG. 6 is a block diagram showing the configuration of the gate circuit shown in FIG. 4.

FIG. 6 shows the configuration of each gate circuit 51-j (j=1 through 4). An input gate 71 supplies image data from the image bus 25-j to the internal memory (not shown) of the image processor 23.

An output gate 72 supplies a start signal STRT from the control section (not shown) of the image processor 23 to the image bus 25-j. The input and output gates 71 and 72 are enabled in accordance with the state of the signal line 47-j. The gate circuit 52-j (j=1 through 4) shown in FIG. 4 has the same arrangement as the gate circuit 51-j (j=1 through 4) in FIG. 6.

The operation for ORing the image data from the image memories 22-1 and 22-2, and writing the ORed result in the image memory 22-3 will be described with reference to the timing charts shown in FIGS. 7A through 7D. In order to initialize the image memory 22-1, the CPU 21 transfers, through the control bus 24, control data including read/write mode designation data for designating the read/write mode, window size designation data, and image bus designation data for designating the image bus 25-1. As a result, the image memory 22-1 is set in the read mode. The image bus designation data in the control data is set in the register 31 (in the case of the read mode) of the image memory 22-1. The decoder 33 of the image memory 22-2 decodes the contents (image bus designation data) of the register 31 and activates only the signal line 35-1 among the signal lines 35-1 through 35-4. Then, only the gate circuit 37-1 in the image memory 22-1 is enabled, and the image bus 25-1 is selected. The CPU 21 then starts the image memory 22-1 through the control bus 24. The image memory 22-1 prepares for output to the selected bus 25-1, and thereafter awaits reception of the start signal STRT from the image bus 25-1.

Subsequently, the CPU 21 supplies, to the image memory 22-2, control data including read/write mode designation data for designating the set-up, i.e., the read mode, window size designation data, and image bus designation data for designating the image 25-2. Unlike in the case of the image memory 22-1, the signal line 35-2 for the image memory 22-2 is activated, and only the gate circuit 37-2 is enabled. After setting up the memory 22-2, the CPU 21 initiates it.

After the set-up for the image memories 22-1 and 22-2 is completed, the CPU 21 transfers, to the image memory 22-3, control data including read/write mode designation data designating the write mode, window size designation data, and image bus designation data for designating the image bus 25-3. Thus, the image memory 22-3 is set in the write mode. The image bus designation data in the control data is set in the register 32 (in the case of the write mode) of the image memory 22-3. The decoder 34 in the image memory 22-3 decodes the image bus designation data in the register 32 and produces an active signal to only the signal line 36-3 among the signal lines 36-1 through 36-4. Only the gate circuit 38-3 in the image memory 22-3 is enabled, and the image bus 25-3 is selected for receiving combined image data. The CPU 21 then initiates the image memory 22-3 through the control bus 24. The image memory 22-3 prepares to receive the combined image data from the selected image bus 25-3, and thereafter waits until the busy/ready signal line (not shown) of the image bus 25-3 indicates the ready state.

The CPU 21 then sets up the image processor 23. The CPU 21 transfers the image bus designation data designating the image bus 25-1 to the image processor 23. The image bus designation data is set in the register 41 in the image processor 23. The decoder 44 in the image processor 23 decodes the image bus designation data in the register 41, and produces an active signal to only the signal line 47-1 among the signal lines 47-1 through 47-4. Thus, only the gate circuit 51-1 among the gate circuits 51-1 through 51-4 in the image processor 23 is enabled, and the image bus 25-1 is selected for receiving first image data.

The CPU 21 then transfers the image bus designation data designating the image bus 25-2 to the image processor 23. The image bus designation data is set in the register 42 of the image processor 23. In this case, the decoder 45 sets only the signal line 48-2 among the signal lines 48-1 through 48-4 in the active state. Only the gate circuit 52-2 among the gate circuits 52-1 through 52-4 is enabled, the image bus 25-2 is selected, and the image data from the image memory 22-2 is supplied to the image processor 23. The CPU 21 then transfers image bus designation data designating the image bus 25-3 to the image processor 23. Therefore the image bus 25-3 is used for outputting combined image data. The image bus designation data designating the image bus 25-3 is set in the register 43 of the image processor 23. The decoder 46 decodes the image bus designation data set in the register 43. Only the signal line 49-3 among the signal lines 49-1 through 49-4 is rendered active in accordance with the decoded output. Only the gate circuit 53-3 among the gate circuits 53-1 through 53-4 is enabled, and the image bus 25-3 is used for outputting the combined image data. Upon completing the set-up of the image processor 23, the CPU 21 initiates the processor 23.

Upon being initiated by the CPU 21, the image processor 23 produces start signals STRT, as shown in FIG. 7A, in synchronism with the bus cycle of the image buses 25-1 through 25-4. The start signals STRT are simultaneously supplied from the output gates 72 of the gate circuits 52-1 and 52-2 enabled by the CPU 21 (among the gate circuits 51-1 through 51-4 and 52-1 through 52-4) to the corresponding image buses 25-1 and 25-2. In the image memory 22-1, the gate circuit 37-1 connected to the image bus 25-1 is enabled. In the image memory 22-2, the gate circuit 37-2 connected to the image bus 25-2 is enabled. The start signal STRT on the image bus 25-1 is supplied to the control section (not shown) of the image memory 22-1 through the input gate 62 in the gate circuit 37-1. Similarly, the start signal STRT on the image bus 25-2 is supplied to the control section (not shown) in the image memory 22-2 through the input gate 62 in the gate circuit 37-2.

Upon simultaneous reception of the start signals STRT from the image buses 25-1 and 25-2, the image memories 22-1 and 22-2 simultaneously start the output of image data of the designated window region after 2 cycles. In the memory 22-1, the gate circuit 37-1 connected to the image bus 25-1 is enabled. In the image memory 22-2, the gate circuit 37-2 connected to the image bus 25-2 is enabled. Therefore, image data output from the memory 22-1 is supplied to the corresponding image bus 25-1 by the output gate 61 in the gate circuit 37-1, as shown in FIG. 7B. Similarly, image data output from the image memory 22-2 is supplied to the image bus 25-2 by the gate circuit 37-2, as shown in FIG. 7C. At this time, the busy/ready signal lines of the buses 25-1 and 25-2 receive the ready signal as well as the image data. The image memories 22-1 and 22-2 simultaneously start image data output within 2 cycles after reception of the start signals STRT, and thereafter continue data output in synchronism with the bus cycle.

In the image processor 23, the gate circuits 51-1 and 51-2 are enabled, the image bus 25-1 is selected for inputting the first image data, and the image bus 25-1 is selected for inputting the second image data, as described above. The image data supplied from the image memories 22-1 and 22-2 onto the buses 25-1 and 25-2 is supplied to the image processor 23 by the gate circuits 51-1 and 51-2. The processor 23 fetches the two image data supplied by the gate circuits 51-1 and 51-2 in synchronism with the bus cycle while the busy/ready signal lines of the buses 25-1 and 25-2 indicate ready states, and ORes the two image data. The processor 23 starts outputting an OR result within, e.g., 2 cycles from the fetching operation of the image data.

In the image processor 23, as described above, the gate circuit 53-3 is enabled, and the image bus 25-3 is selected in order to output combined image data. Therefore, an OR output obtained by the image processor 23 is supplied onto the image bus 25-3 by the gate circuit 53-3, as shown in FIG. 7D. At this time, the busy/ready signal line of the bus 25-3 receives the ready signal as well as the ORed result.

In the image memory 22-3, the gate circuit 38-3 is enabled, and the image bus 25-3 is selected for receiving the combined image data. The ORed result produced onto the bus 25-3 by the processor 23, i.e., the combined image data is supplied to the memory 22-3 by the gate circuit 38-3.

The image memory 22-3 fetches the ORed result supplied by the gate circuit 38-3 in synchronism with the bus cycle while the busy/ready signal line of the bus 25-3 indicates the ready state, and writes the received ORed result in the internal memory (not shown). The above-mentioned operation is performed repeatedly over the entire window region designated by the CPU 21, and the combined image data of the window region is formed in the image memory 22-3.

In the embodiment described above, the image processor 23 simultaneously fetches image data from the two buses selected from the image buses 25-1 through 25-4. However, the present invention is not limited to this. For example, when a circuit configuration corresponding to the register 41, the decoder 44 and the gate circuits 51-1 through 51-4, added, image data can be simultaneously fetched from three buses among the image buses 25-1 through 25-4.

What is claimed is:

1. An image processor system, comprising:
   a control bus and a plurality of image buses for connecting an image processor and a plurality of image memories;
   a central processing unit (CPU) for controlling said image processor and said image memories through said control bus;
   a start signal output gate circuit, arranged in said image processor, for simultaneously outputting start signals designating the start of image data, output to those of said plurality of image buses which are designated by said CPU;
   a start signal input gate circuit, arranged in each of said image memories, for receiving the start signal through said image bus designated by said CPU;
   means, arranged in each of said image memories, for starting image data output to said designated image bus synchronously with a bus cycle of said image bus and in response to the start signal received through said start signal input gate circuit; and
   means, arranged in said image processor, for simultaneously fetching the data from said designated image buses.

2. A system according to claim 1, wherein said means for starting image data output to the designated image bus in synchronism with said bus cycle of said image bus comprises:
   latch means for holding image bus designation data supplied from said CPU through said control bus;
   decoder means for decoding the image bus designation data from said latch means; and
   a plurality of gate circuits for outputting, in response to a decoding output from said decoder means and in synchronism with the bus cycle of said image bus, image data to said image bus, among said plurality of image buses, which is designated by the image bus designation data.

3. A system according to claim 1, wherein said means for simultaneously fetching the data comprises:
   latch means, connected to said control bus, for latching image bus designation data designating said image bus;
   decoder means for decoding the image bus designation data from said latch means; and
   a plurality of gate circuits for simultaneously inputting, in response to a decoding output from said decoder means, image data transferred through different image buses among said plurality of image buses from said plurality of image memories.

* * * * *